United States Patent
Kweeder et al.

(10) Patent No.: US 9,932,277 B2
(45) Date of Patent: Apr. 3, 2018

(54) METHOD FOR PRODUCING AMMONIUM SULFATE NITRATE

(75) Inventors: James A. Kweeder, Morristown, NJ (US); Raymond G. Wissinger, Morristown, NJ (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 529 days.

(21) Appl. No.: 13/286,440

(22) Filed: Nov. 1, 2011

(65) Prior Publication Data

US 2012/0131972 A1 May 31, 2012

Related U.S. Application Data

(60) Provisional application No. 61/409,333, filed on Nov. 2, 2010.

(51) Int. Cl.
*C05C 1/00* (2006.01)
*C01C 1/246* (2006.01)
*C05C 3/00* (2006.01)

(52) U.S. Cl.
CPC ............ *C05C 1/00* (2013.01); *C01C 1/246* (2013.01); *C05C 3/00* (2013.01)

(58) Field of Classification Search
CPC ........... C01B 17/96; C01C 1/24; C01C 1/245; C01G 1/10; C01D 5/06; C01D 5/08; C05C 1/00; C05C 3/00; C06B 31/28
USPC ........... 71/54, 58, 59, 60; 423/388, 396, 397
See application file for complete search history.

(56) References Cited

U.S. PATENT DOCUMENTS

| | | | |
|---|---|---|---|
| 2,568,901 A * | 9/1951 | Stengel | 423/396 |
| 2,762,699 A | 9/1956 | Fritz | |
| 2,830,875 A * | 4/1958 | Shurter, Jr. | 423/396 |
| 3,285,695 A | 11/1966 | Cook et al. | |
| 3,301,657 A | 1/1967 | Geoffrey et al. | |
| 5,082,487 A | 1/1992 | Mayer | |
| 6,344,066 B1 | 2/2002 | Eyal | |
| 6,689,181 B2 | 2/2004 | Highsmith et al. | |
| 2002/0095966 A1* | 7/2002 | Highsmith et al. | 71/59 |
| 2007/0096350 A1 | 5/2007 | Kweeder et al. | |
| 2007/0199357 A1 | 8/2007 | Kweeder et al. | |
| 2010/0047149 A1 | 2/2010 | Stevens et al. | |

(Continued)

FOREIGN PATENT DOCUMENTS

| | | |
|---|---|---|
| EP | 1595860 A2 | 11/2005 |
| EP | 1595860 A2 | 11/2005 |
| EP | 1923376 A2 | 5/2008 |

(Continued)

OTHER PUBLICATIONS

EPA, "Ammonium Nitrate," Jul. 1993, pp. 8.3-1 to 8.3-9, retrieved from http://www.epa.gov/ttnchie1/ap42/ch08/final/c08s03.pdf on Apr. 25, 2014.*

(Continued)

*Primary Examiner* — Anthony J Zimmer
(74) *Attorney, Agent, or Firm* — Faegre Baker Daniels LLP

(57) ABSTRACT

The present technology provides methods and processes of producing ammonium sulfate nitrate 1:2 double salts by combining ammonium sulfate solution, nitric acid and ammonia in an aqueous reaction mixture. The methods include reacting the aqueous reaction mixture, followed by removing water to form the ammonium sulfate nitrate 1:2 double salt.

33 Claims, 1 Drawing Sheet

Process for Production of Ammonium Sulfate Nitrate

(56) References Cited

U.S. PATENT DOCUMENTS

2010/0254880 A1  10/2010  Kweeder et al.

FOREIGN PATENT DOCUMENTS

| | | |
|---|---|---|
| EP | 1923376 A2 | 5/2008 |
| EP | 1595860 A3 | 4/2010 |
| EP | 1923376 A3 | 1/2011 |
| GB | 360165 A | 11/1931 |
| GB | 798680 A | 7/1958 |
| GB | 798690 A | 7/1958 |
| GB | 1259778 | 1/1972 |
| JP | 424135 A | 2/1967 |
| JP | 2004523447 A | 8/2004 |
| JP | 2008073586 A | 4/2008 |
| JP | 2011528315 A | 11/2011 |
| RU | 2227792 | 4/2004 |
| WO | 2010008987 A2 | 1/2010 |
| WO | 2012061460 A2 | 5/2012 |

OTHER PUBLICATIONS

International Search Report and Written Opinion dated Jun. 29, 2012 in International Application No. PCT/US2011/058894 from the International Searching Authority.

Ando, J., "Increase in Weight and Degradation of Granulated Fertilizer Compounds Containing Nitrates and Sulfates," L.S.MA. Technical Meeting Prague, Czechoslovakia, International Association of Manufacturers of Superphosphates and Fertilizer Compounds, dated Sep. 1974, 4 pages.

"Ammonium sulfate nitrate, a new German nitrogenous fertilizer," Experiment Station Record (US Dept. of Agriculture), 1920, 44, 216, Abstract only.

V.A. Sokolov, "The equilibrium and formation of complexes in the system $H_2O$—$NH_4NO_3(NH_4)_2SO_4$," Bull. Acad. Sci. URSS, Classe Sci. math. Nat., Ser. Chim., 1938, No. 1, 123-35, Abstract only.

R.K. Bahl, et al, "Ternary system: $NH_4NO_3$—$(NH_4)_2SO_4$—$H_2O$ at 25o," Journal of the Indian Chemical Society, 1941, 18, 307-8, Abstract only.

Jan Turlehj, "methods for production and physciochemical properties of ammonium nitrate sulfate," Przemysi Chemiczny, 1976, 55(12), 611-14, Abstract only.

Malquori A., et al, Contribution to the knowledge of complex fertilizing components, La Chimica e l'industria, 1964, vol. 46, No. 6, pp. 637-647.

Ando, Miyamura, & Akiyama, Compounds in Mixed nitrate Fertilizers and their Behavior, The Chemical Society of Japan, 1974, No. 9, pp. 1617-1622.

Junpei Ando, et al., System of Ammonium Nitrate and Fertilizer Salts, Journal of the Society of Chemical Industry, 1970, vol. 73, No. 12, p. 2614-2618, DOI:10.1246/nikkashi1898.73.12_2614.

Montejo-Bernardo, J. M., et. al. Structures of Relevant Ammonium Salts in Fertilizers. Structural Science, Acta Crystallographica Section B, 66(3):358-365, Jun. 2010.

Yukio Date, Equilibrium of $(NH_4)_2SO_4$—$NH_4NO_3$—$NH_4SO_3NH_2$—$H_2O$ System at 25° C., 1960, vol. 63, No. 11, p. 1913-1916, DOI:10.1246/nikkashi1898.63.11_1913.

Zapp, K.-H., et al. Ammonium Compounds. Ullmann's Encyclopedia of Industrial Chemistry, 263-287, Jun. 15, 2000.

[No identified author]. "Ammonium Sulphate Nitrate Production: Review of Commercially Available Processes," Nitrogen, 53:27-30, May/Jun. 1968.

Dubovitski, A. M. The Manufacture of Inorganic Fertilizer. Chemical Industry Press, 178-179, Dec. 31, 1958 (with partial translation).

Office Action issued in CN Application No. 201180052731.5, dated Jun. 29, 2016, 15 pages (with English translation).

* cited by examiner

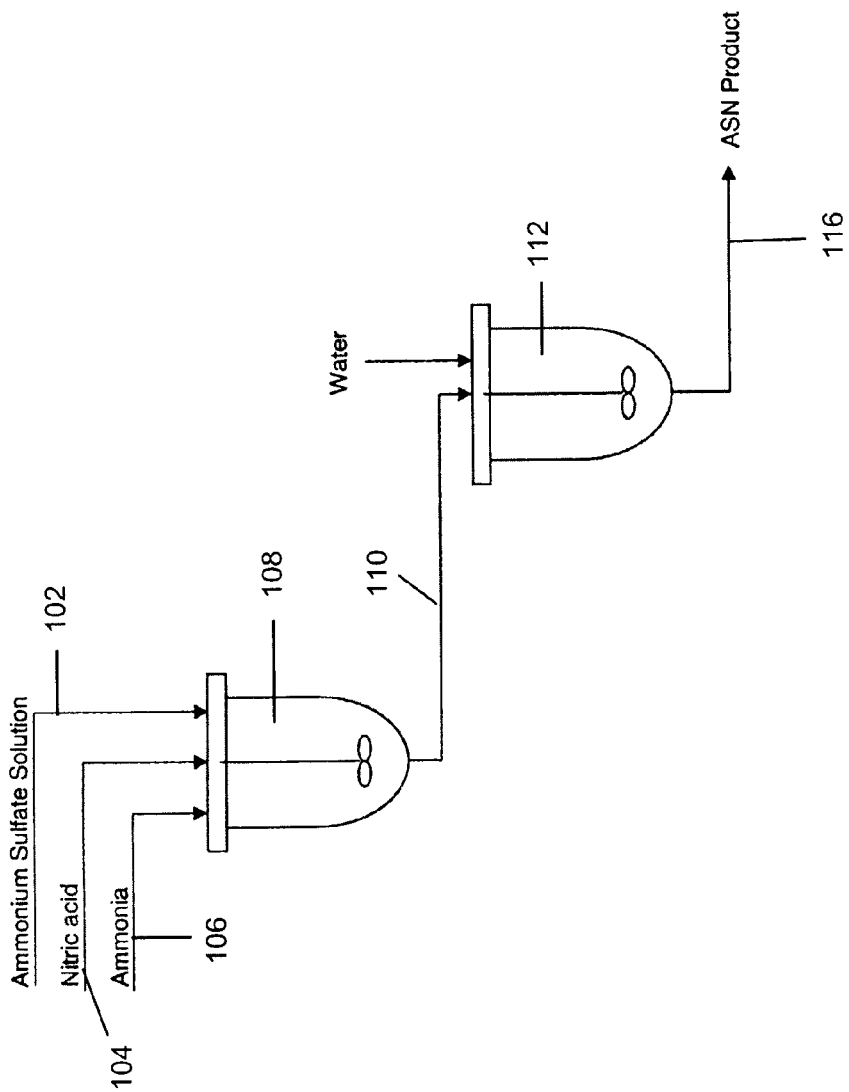

METHOD FOR PRODUCING AMMONIUM SULFATE NITRATE

RELATED APPLICATION

This application claims the benefit of U.S. Provisional Application Ser. No. 61/409,333 entitled "METHOD FOR PRODUCTION OF AMMONIUM SULFATE NITRATE" filed Nov. 2, 2010, which application is incorporated by reference herein in its entirety.

FIELD OF THE INVENTION

The present technology relates to the production of ammonium sulfate nitrate (ASN) composites useful as fertilizers.

DESCRIPTION OF RELATED ART

Ammonium sulfate nitrate (ASN), one of the first synthetic fertilizers, has been in continuous use for nearly 100 years providing the important primary and secondary nutrients, nitrogen and sulfur. Nitrogen is provided in part through the nitrate ion, desirable because it is readily adsorbed by many plants and promotes early growth. As historically used, the term "ammonium sulfate nitrate" has not referred to a specific chemical compound with elements in fixed proportions. Rather, it has been used to describe various mixtures of ammonium nitrate and ammonium sulfate. The Association of American Plant Food Officials (AAPFCO), which has assumed the role of monitoring and defining fertilizers, has attempted to bring order to the nomenclature. APPFCO has defined ASN as a double salt of ammonium sulfate and ammonium nitrate in equal molar proportions having a nitrogen content not less than 26%. An equal molar mixture of ammonium sulfate and ammonium nitrate has a nitrogen content of 26.4%.

Despite the AAPFCO definition, the name, ammonium sulfate nitrate, has been used to designate many combinations of ammonium sulfate and ammonium nitrate. See for instance, R. S. Meline, J. Agric. Food Chem., 16(2), 235-240 (1968), where one product has a 30% nitrogen content. U.S. Pat. No. 2,795,495 to Steinle et al. describes ammonium sulfate nitrate as having an ammonium sulfate/ammonium nitrate mole ratio of 1:2 not 1:1. Great Britain Patent No. 798,690 states that the proportion of ammonium sulfate is not critical and may be used in any proportion necessary to obtain the desired nitrogen level. The use of such terminology has led to confusion between pure double salts and mixtures. Additionally, the order of the words, sulfate and nitrate, are sometimes interchanged in the literature.

A double salt is a distinct compound. Double salts consisting of $(NH_4)_2SO_4*2(NH_4NO_3)$ and $(NH_4)_2SO_4*3(NH_4NO_3)$ (hereinafter the 1:2 double salt and the 1:3 double salt respectively) have been isolated and confirmed. The 1:3 product was isolated from aqueous solution and reported as early as 1909 (Reicher et al., Chemish Weekblad., 3 (January), 51-56 (1909)). Scheinemakers et al. reported in 1910 in the same publication (Volume 6, 1910, pages 51-56) the isolation of a 1:2 double salt as well as the 1:3 double salt from aqueous solutions. The existence of 1:2 and 1:3 double salts have been confirmed by Nikonova (loc. cit.); Itoh, Kogyo Kagaku Zasshi, 63(11), 1913-1916 (1960); Emons et al., Wissenschaftliche. Zeitschrift Techn. Hocksch. Chem. Leuna-Merseburg, 14(3), 295-299 (1972); and Smith et al., J. Agr. Food Chem., 10, 77-78 (1962), among others.

Reported manufacturing processes for ammonium sulfate nitrate describe preparation of uniform fertilizer granules. Most products are simply mixtures of ammonium sulfate and ammonium nitrate rather than specific crystal structures since the reported chemical compositions do not reflect any specific compound. An exception is U.S. Pat. No. 2,762,699, which claims a process for the manufacture of the 1:2 double salt by reacting nitric and sulfuric acids with ammonia in a two-stage neutralization process. In the first stage, nitric acid is neutralized with ammonia to form a concentrated ammonium nitrate solution. In the second stage, the ammonium nitrate solution is reacted with sulfuric acid and additional ammonia, forming a solution of ammonium nitrate and ammonium sulfate. The ASN product is then recovered by removal of water from the reaction mixture. While effective, this process is inherently more complex and expensive than one which employs single-stage neutralization.

Another known method for producing ASN is based on the addition of solid ammonium sulfate and water to molten ammonium nitrate, as described in U.S. Pat. No. 6,689,181 to Highsmith et al., which describes (a) charging materials comprising ammonium sulfate particles, ammonium nitrate and water to a melting device, wherein the molar ratio of ammonium sulfate to ammonium nitrate is about 0.9:1 to about 1.1:1 and the water is more than 2 wt. % to about 10 wt. % of the charged materials; (b) melting the ammonium nitrate and dissolving at least a portion of the ammonium sulfate particles at a temperature of about 180° C. to about 210° C.; (c) reacting the charged materials at a temperature of about 180° C. to about 210° C.; and (d) solidifying the product at a cooling rate of at least about 100° C./min. Such a method tends to require vigorous agitation to properly disperse the ammonium sulfate particles in the ammonium nitrate melt and careful temperature control to avoid possible explosion of ammonium nitrate. The vigorous mixing could create gas bubbles in the molten ammonium nitrate, which potentially increases the risk of explosion.

SUMMARY OF THE INVENTION

The present technology relates to processes for producing ammonium sulfate nitrate double salts that facilitate intimate mixing of ammonium nitrate and ammonium sulfate without the complexity and high cost of two-stage neutralization, or the potential hazards of working with molten ammonium nitrate.

In some embodiments, the present technology relates to a method of producing an ammonium sulfate nitrate 1:2 double salt in which ammonium sulfate, nitric acid and a source of ammonia are combined in an aqueous solution to form a reaction mixture. The reaction mixture is heated to a temperature from about 160° C. to about 180° C. and is allowed to undergo a reaction for a time period sufficient to form an intermediate mixture. Sufficient water is removed from the intermediate mixture to form the ammonium sulfate nitrate 1:2 double salt.

In some embodiments, the present technology relates to a method of producing an ammonium sulfate nitrate 1:2 double salt in which ammonium sulfate, nitric acid and a source of ammonia are combined to form an aqueous reaction mixture. The nitric acid and the source of ammonia are reacted in the presence of the ammonium sulfate to form an aqueous solution of ammonium nitrate and ammonium sulfate. The water content of the aqueous solution of ammonium nitrate and ammonium sulfate is reduced to form an ammonium sulfate nitrate 1:2 double salt.

BRIEF DESCRIPTION OF THE DRAWINGS

Specific examples have been chosen for purposes of illustration and description, and are shown in the accompanying drawings, forming a part of the specification.

FIG. 1 illustrates a process of the present technology for producing ammonium sulfate nitrate.

DETAILED DESCRIPTION

The present technology provides methods and processes of producing ammonium sulfate nitrate (ASN) by using ammonium sulfate solution, nitric acid and ammonia as starting materials. Methods of the present technology can be carried out in a batch process or in a continuous process. In some embodiments, methods of the present technology are carried out in a continuous process.

In some embodiments, and in accordance with the methods of the present technology, ammonium sulfate solution is used as a starting material instead of solid ammonium sulfate or sulfuric acid, and ammonium nitrate is produced by a single-stage neutralization of nitric acid with ammonia in the presence of ammonium sulfate solution. In some embodiments, nitric acid and ammonia are reacted in the presence of an ammonium sulfate solution, forming a mixture of ammonium nitrate and ammonium sulfate in water. The water is then evaporated, forming a molten salt mixture which is subsequently converted to the desired ASN product. In some examples, the ASN product is an ASN 1:2 double salt having the formula $(NH_4)_2SO_4 \cdot 2(NH_4NO_3)$.

A diagram of an illustrative but non-limiting ASN production process 100 is shown in FIG. 1. As illustrated, the process includes adding, or charging, predetermined amounts of ammonium sulfate solution 102, nitric acid solution 104, and a source of ammonia to a first reactor 108 to form a reaction mixture. In the illustrated example, the source of ammonium is an ammonium hydroxide solution 106, although other ammonium sources may also be used. In some embodiments, the solvent for each solution is water.

The solutions can have any suitable concentration of each component. In one example, the concentration of the ammonium sulfate can be about 40 wt. % in ammonium sulfate solution 102, the concentration of nitric acid can be from about 68 wt. % to about 70 wt. % in the nitric acid solution 104, and the concentration of ammonium hydroxide can be about 29 wt. % in the ammonium hydroxide solution 106. In an alternative example, ammonia gas can be added to the reaction mixture instead of ammonium hydroxide solution 106.

The amounts of each ingredient that can be added to the first reactor 108 to form the reaction mixture depend on the concentrations of ammonium sulfate, nitric acid and ammonia in the solutions. In some embodiments, a molar ratio of ammonium sulfate to nitric acid added to the reactor is about 1:1. In some embodiments, ammonia can be added in excess of the stoichiometric ratio required for neutralization in order to ensure complete conversion of nitric acid. In some embodiments, the molar ratio of ammonia to nitric acid added to the reactor is about 1.3:1.

The process can proceed by heating the reaction mixture in the first reactor 108 to a temperature from about 160° C. to about 180° C., and allowing the reaction mixture to undergo a reaction for a time period sufficient to form an intermediate mixture 110. The time period during which the reaction is allowed to proceed in the first reactor 108 may be long enough to result in the nitric acid being completely neutralized. The intermediate mixture 110 includes ammonium sulfate and ammonium nitrate, and may include from about 15 wt. % water to about 20 wt. % water. While the water content of the intermediate mixture 110 can vary, in some embodiments the water content is high enough to provide sufficient fluidity to facilitate removal of the intermediate mixture 110 from the first reactor 108.

In some embodiments, as illustrated, the process then includes transferring the intermediate mixture 110 to a second reactor 112 and finishing the intermediate mixture 110 to form an ASN product 116. In some embodiments, the second reactor 112 can have at least one mixer 114, and can include equipment to heat the intermediate mixture 110 when it is in the second reactor 112. The second reactor 112 can also be open at the top, to facilitate removal of water from the intermediate mixture 110. In the second reactor 112, the intermediate mixture 110 can be heated to a finishing temperature from about 175° C. to about 190° C. In some embodiments, the second reactor 112 may be any continuous or batch-operated equipment that is configured to controllably remove water from the intermediate mixture 110.

Water can be removed from the intermediate mixture 110 by holding the intermediate mixture at the heated temperature for a sufficient amount of time to allow the desired amount of water to evaporate. In some embodiments, removing the water from the intermediate mixture includes continuously stirring the intermediate mixture 110 while holding the intermediate mixture 110 at the finishing temperature. Without being bound by any particular theory, it is believed that continuous stirring during the water removal promotes water removal as well as intimate mixing of the ammonium sulfate and ammonium nitrate, which can promote formation of the desired 1:2 ASN double salt.

In some embodiments, the ASN product 116 formed in the finishing reactor has a water content from about 0.4 wt. % to about 1.0 wt. %. One way of obtaining the desired water content of the ASN product 116 is by removing water from the intermediate mixture 110 until the water content is in the desired range. In some embodiments, such a method may include continuous or frequent periodic monitoring of the water content of the intermediate mixture 110, in order to know when to terminate the water removal process.

In some embodiments, the desired water content of the ASN product 116 may be obtained by removing substantially, or essentially, all of the water from the intermediate mixture 110, and then adding a final amount of water back into the intermediate mixture 110 to form the ASN product 116. In at least one example, a final amount of water can be about 4 wt. %, which can be added back into the intermediate mixture 110 in the second reactor 112, and then the intermediate mixture 110 and the added final amount of water can be stirred for a short period of time, such as about one minute or more, to produce the ASN product.

Once the ASN product 116 is formed in the second reactor 112, the process can include removing the ASN product 116 from the second reactor 112. The process can also include cooling the ASN product 116, preferably at ambient or room temperature, until the ASN product 116 is solidified.

In some embodiments, the final product has an ammonium sulfate nitrate 1:2 double salt content of at least about 50 weight percent, at least about 60 weight percent, at least about 70 weight percent, at least about 80 weight percent or at least about 90 weight percent. In some embodiments, the final product has an ammonium sulfate nitrate 1:3 double salt content of less than about 20 weight percent, less than about 10 weight percent, less than about 5 weight percent or less than about 1 weight percent.

In some embodiments, the final product has a 1:2 ASN double salt content from about 65 wt. % to about 75 wt. %. In some embodiments, the product has a combined content of 1:3 ASN double salt and unreacted ammonium nitrate of less than about 5 wt. %.

EXAMPLES

The basic procedure used in the examples was as follows:

An ammonium sulfate (AS) solution was added to a 1 liter glass reactor equipped with a condenser. Nitric acid (NA) was added to the reactor, followed by adding ammonium hydroxide (AH) to the reactor. The reaction mixture was heated in the reactor to a temperature of about 175° C. and was held at the reaction temperature to react the nitric acid with the ammonium hydroxide to form ammonium nitrate: $HNO_3+HN_3$ (aq)|$NH_4$)($NO_3$)

Water was evaporated, as measured by volume of condensate collected, to produce an intermediate mixture having a water content of about 15 wt. % to about 20 wt. %. The intermediate mixture was drained from the reactor and transferred to a finishing reactor.

In the finishing reactor, the intermediate mixture was heated to a temperature of about 185° C. and held at that temperature with continuous stirring to remove water. The residual water content of the intermediate mixture was reduced to less than about 1 wt. %.

Example 1

Raw Materials:
  606 g ammonium sulfate solution (40 wt. % in $H_2O$)
  167.5 g nitric acid (68-70 wt. % in $H_2O$)
  139 g ammonium hydroxide (~29%, $NH_3$ in $H_2O$)

The initial reaction between nitric acid and ammonium hydroxide was allowed to proceed until 450 ml of condensate was collected. The product was transferred to a finishing reactor and heated to 185° C. The product was stirred continuously for 25 minutes, reducing the water content to less than 0.1 wt. %. An additional 15.6 g of water was then added to the finishing reactor and the mixture was stirred for two minutes. The product was removed from the reactor and cooled to a solid at room temperature. A sample of the product was ground to a fine powder and analyzed by x-ray diffraction (XRD) to determine the relative amounts of AS, AN, and 1:2 and 1:3 double salts. The moisture content of the sample was also analyzed by the Karl Fischer method. Results of the analyses are given in the table below:

| Component | Weight Percent |
| --- | --- |
| ammonium sulfate | 24 |
| ammonium nitrate | 0 |
| 1:2 double salt | 75 |
| 1:3 double salt | 0 |
| water | 1 |

Example 2

Raw Materials:
  303 g ammonium sulfate solution (40 wt. % in $H_2O$)
  167.5 g nitric acid (68-70 wt. % in $H_2O$)
  139 g ammonium hydroxide (~29%, $NH_3$ in $H_2O$)

The initial reaction between nitric acid and ammonium hydroxide was allowed to proceed until 330 ml of condensate was collected. The product was transferred to a finishing reactor, where it was heated to 185° C. and stirred continuously for 25 minutes, after which 121.2 g of finely ground solid ammonium sulfate was stirred thoroughly into the mixture. An additional 15.6 g of water was then added to the finishing reactor and the mixture was stirred for one minute. The product was removed from the reactor and cooled to a solid at room temperature. A sample of the product was ground to a fine powder and analyzed by x-ray diffraction (XRD) to determine the relative amounts of AS, AN, and 1:2 and 1:3 double salts. The moisture content of the sample was also analyzed by the Karl Fischer method. Results of the analyses for duplicate samples (A and B) are as follows:

| Component | Sample A (wt. %) | Sample B (wt. %) |
| --- | --- | --- |
| ammonium sulfate | 8 | 13 |
| ammonium nitrate | 0 | 0 |
| 1:2 double salt | 91 | 86 |
| 1:3 double salt | 0 | 0 |
| water | 1 | 1 |

Example 3

Raw Materials:
  606 g ammonium sulfate solution (40 wt. % in $H_2O$)
  167.5 g nitric acid (68-70 wt. % in $H_2O$)
  139 g ammonium hydroxide (~29%, $NH_3$ in $H_2O$)

The initial reaction between nitric acid and ammonium hydroxide was allowed to proceed until 450 ml of condensate was collected. The product was transferred to a finishing reactor, where it was heated to 185° C. and stirred continuously for 25 minutes. An additional 15.6 g of water was then added to the finishing reactor and the mixture was stirred. Samples of product were taken at one minute (Sample A) and five minutes (Sample B) after the water addition. Each sample was cooled to a solid at room temperature, ground to a fine powder and analyzed by x-ray diffraction (XRD) to determine the relative amounts of AS, AN, and 1:2 and 1:3 double salts. The moisture content of each sample was also analyzed by the Karl Fischer method. Results of the analyses for duplicate samples (A and B) are as follows:

| Component | Sample A (wt. %) | Sample B (wt. %) |
| --- | --- | --- |
| ammonium sulfate | 10 | 25 |
| ammonium nitrate | 0 | 0 |
| 1:2 double salt | 89 | 45 |
| 1:3 double salt | 0 | 30 |
| water | 1.4 | 0.1 |

It can be seen from the above results that the sample taken five minutes after water addition (Sample B) has a lower residual water content and contains less 1:2 double salt than the sample taken one minute after water addition (Sample A).

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of producing an ammonium sulfate nitrate 1:2 double salt, the method comprising:
    combining an aqueous solution of ammonium sulfate, a nitric acid solution, and a source of ammonia in an aqueous solution to form a reaction mixture;
    heating the reaction mixture to a temperature from about 160° C. to 175° C.;
    allowing the reaction mixture to undergo a reaction to form an intermediate mixture comprising ammonium nitrate, ammonium sulfate, and water, wherein the intermediate mixture includes from about 15 wt. % to about 20 wt. % water;
    heating the intermediate mixture to a finishing temperature from greater than 175° C. to about 190° C.;
    holding the intermediate mixture at the finishing temperature to remove water from the intermediate mixture to form a molten salt mixture; and
    forming a product by solidifying the molten salt mixture, wherein the product comprises an ammonium sulfate nitrate 1:2 double salt, wherein the reaction mixture includes a molar ratio of ammonia to nitric acid that is about 1.3:1.

2. A method of producing an ammonium sulfate nitrate 1:2 double salt, the method comprising:
    combining an aqueous solution of ammonium sulfate, a nitric acid solution, and a source of ammonia in an aqueous solution to form a reaction mixture;
    heating the reaction mixture to a temperature from about 160° C. to 175° C.;
    allowing the reaction mixture to undergo a reaction to form an intermediate mixture comprising ammonium nitrate, ammonium sulfate, and water, wherein the intermediate mixture includes from about 15 wt. % to about 20 wt. % water;
    heating the intermediate mixture to a finishing temperature from greater than 175° C. to about 190° C.;
    holding the intermediate mixture at the finishing temperature to remove water from the intermediate mixture to form a molten salt mixture; and
    forming a product by solidifying the molten salt mixture, wherein the product comprises an ammonium sulfate nitrate 1:2 double salt, wherein combining the aqueous solution of ammonium sulfate, the nitric acid solution, and the source of ammonia in an aqueous solution to form a reaction mixture comprises combining the aqueous solution of ammonium sulfate solution, the nitric acid solution, and an ammonium hydroxide solution.

3. The method of claim 2, wherein said combining the aqueous solution of ammonium sulfate, the nitric acid solution, and the source of ammonia in an aqueous solution to form a reaction mixture further comprises adding solid ammonium sulfate.

4. The method of claim 1, wherein the product has a water content of about 0.4 wt. % to about 1 wt. %.

5. The method of claim 1, wherein holding the intermediate mixture at the finishing temperature to remove water from the intermediate mixture to form molten salt mixture comprises:
    removing substantially all of the water from the intermediate mixture; and
    adding a final amount of water back into molten salt mixture.

6. A method of producing an ammonium sulfate nitrate 1:2 double salt, the method comprising:
    combining an aqueous solution of ammonium sulfate, a nitric acid solution, and a source of ammonia to form an aqueous reaction mixture;
    heating the aqueous reaction mixture to a temperature of about 175° C.;
    reacting the nitric acid and the source of ammonia in the presence of the ammonium sulfate to form an aqueous solution of ammonium nitrate and ammonium sulfate, wherein the aqueous solution of ammonium nitrate and water includes from about 15 wt. % to about 20 wt. % water;
    heating the aqueous solution to a finishing temperature of about 185° C.;
    reducing the water content of the aqueous solution of ammonium nitrate and ammonium sulfate by holding the aqueous solution at the finishing temperature to form a molten salt mixture; and
    forming a product by solidifying the molten salt mixture, wherein the product comprises an ammonium sulfate nitrate 1:2 double salt.

7. The method of claim 6, wherein combining the aqueous solution of ammonium sulfate, the nitric acid solution, and the source of ammonia to form an aqueous reaction mixture comprises adding the source of ammonia in stoichiometric excess with respect to the nitric acid.

8. The method of claim 6, wherein combining the aqueous solution of ammonium sulfate, the nitric acid solution, and the source of ammonia to form an aqueous reaction mixture further comprises adding solid ammonium sulfate.

9. The method of claim 6, wherein the product has a water content of about 0.4 wt. % to about 1 wt. %.

10. The method of claim 6, wherein reducing the water content of the aqueous solution of ammonium nitrate and ammonium sulfate to form the molten salt mixture comprises:
    removing about all of the water from the aqueous solution; and
    adding a final amount of water back into the molten salt mixture.

11. The method of claim 1, wherein the product has a weight content of ammonium sulfate nitrate 1:2 double salt of at least about 60 weight percent and an ammonium sulfate nitrate 1:3 double salt weight content of less than about 5 wt. %.

12. The method of claim 6, wherein the product has a weight content of ammonium sulfate nitrate 1:2 double salt of at least about 60 weight percent and an ammonium sulfate nitrate 1:3 double salt weight content of less than about 5 wt. %.

13. The method of claim 1, wherein the product has a combined content of ammonium sulfate nitrate 1:3 double salt and unreacted ammonium nitrate of less than about 5 wt. %.

14. The method of claim 1, wherein the product has an ammonium sulfate nitrate 1:3 double salt weight content of less than about 1 wt. %.

15. The method of claim 6, wherein the product has an ammonium sulfate nitrate 1:3 double salt weight content of less than about 1 wt. %.

16. A method of producing an ammonium sulfate nitrate 1:2 double salt, the method comprising:
    combining an aqueous solution of ammonium sulfate, a nitric acid solution, and a source of ammonia in an aqueous solution to form a reaction mixture;
    heating the reaction mixture to a temperature from about 160° C. to 175° C.;

allowing the reaction mixture to undergo a reaction to form an intermediate mixture comprising ammonium nitrate, ammonium sulfate, and water, wherein the intermediate mixture includes from about 15 wt. % to about 20 wt. % water;

heating the intermediate mixture to a finishing temperature is from 180° C. to 190° C.;

holding the intermediate mixture at the finishing temperature to remove water from the intermediate mixture to form a molten salt mixture; and forming a product by solidifying the molten salt mixture, wherein the product comprises an ammonium sulfate nitrate 1:2 double salt.

17. A method of producing an ammonium sulfate nitrate 1:2 double salt, the method comprising:

combining an aqueous solution of ammonium sulfate, a nitric acid solution, and a source of ammonia in an aqueous solution to form a reaction mixture;

heating the reaction mixture to a temperature from about 160° C. to 175° C.;

allowing the reaction mixture to undergo a reaction to form an intermediate mixture comprising ammonium nitrate, ammonium sulfate, and water, wherein the intermediate mixture includes from about 15 wt. % to about 20 wt. % water;

heating the intermediate mixture to a finishing temperature is from about 185° C. to about 190° C.;

holding the intermediate mixture at the finishing temperature to remove water from the intermediate mixture to form a molten salt mixture; and forming a product by solidifying the molten salt mixture, wherein the product comprises an ammonium sulfate nitrate 1:2 double salt.

18. The method of claim 6, wherein the wherein the aqueous solution includes a molar ratio of ammonium sulfate to nitric acid that is about 1:1.

19. The method of claim 2, wherein the product has a water content of about 0.4 wt. % to about 1 wt. %.

20. The method of claim 16, wherein the product has a water content of about 0.4 wt. % to about 1 wt. %.

21. The method of claim 17, wherein the product has a water content of about 0.4 wt. % to about 1 wt. %.

22. The method of claim 2, wherein holding the intermediate mixture at the finishing temperature to remove water from the intermediate mixture to form molten salt mixture comprises:

removing substantially all of the water from the intermediate mixture; and adding a final amount of water back into molten salt mixture.

23. The method of claim 16, wherein holding the intermediate mixture at the finishing temperature to remove water from the intermediate mixture to form molten salt mixture comprises:

removing substantially all of the water from the intermediate mixture; and adding a final amount of water back into molten salt mixture.

24. The method of claim 17, wherein holding the intermediate mixture at the finishing temperature to remove water from the intermediate mixture to form molten salt mixture comprises:

removing substantially all of the water from the intermediate mixture; and adding a final amount of water back into molten salt mixture.

25. The method of claim 2, wherein the product has a weight content of ammonium sulfate nitrate 1:2 double salt of at least about 60 wt. % and an ammonium sulfate nitrate 1:3 double salt weight content of less than about 5 wt. %.

26. The method of claim 16, wherein the product has a weight content of ammonium sulfate nitrate 1:2 double salt of at least about 60 wt. % and an ammonium sulfate nitrate 1:3 double salt weight content of less than about 5 wt. %.

27. The method of claim 17, wherein the product has a weight content of ammonium sulfate nitrate 1:2 double salt of at least about 60 wt. % and an ammonium sulfate nitrate 1:3 double salt weight content of less than about 5 wt. %.

28. The method of claim 1, wherein the product has a combined content of ammonium sulfate nitrate 1:3 double salt and unreacted ammonium nitrate of less than about 5 wt. %.

29. The method of claim 16, wherein the product has a combined content of ammonium sulfate nitrate 1:3 double salt and unreacted ammonium nitrate of less than about 5 wt. %.

30. The method of claim 17, wherein the product has a combined content of ammonium sulfate nitrate 1:3 double salt and unreacted ammonium nitrate of less than about 5 wt. %.

31. The method of claim 2, wherein the product has an ammonium sulfate nitrate 1:3 double salt weight content of less than about 1 wt. %.

32. The method of claim 16, wherein the product has an ammonium sulfate nitrate 1:3 double salt weight content of less than about 1 wt. %.

33. The method of claim 17, wherein the product has an ammonium sulfate nitrate 1:3 double salt weight content of less than about 1 wt. %.

* * * * *